Aug. 6, 1968  B. F. KRANE  3,395,518
AIR FILTER WITH TRAVELING FILTER-MEDIUM SCREEN
Filed Dec. 28, 1966  3 Sheets-Sheet 1
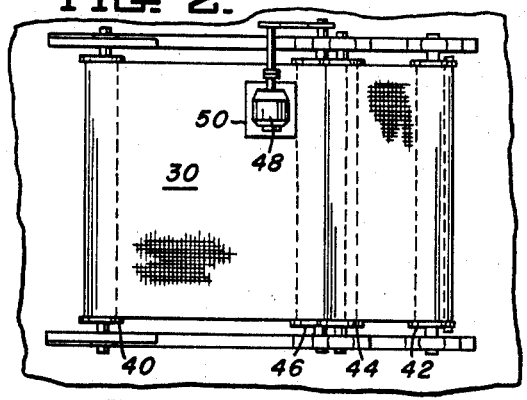
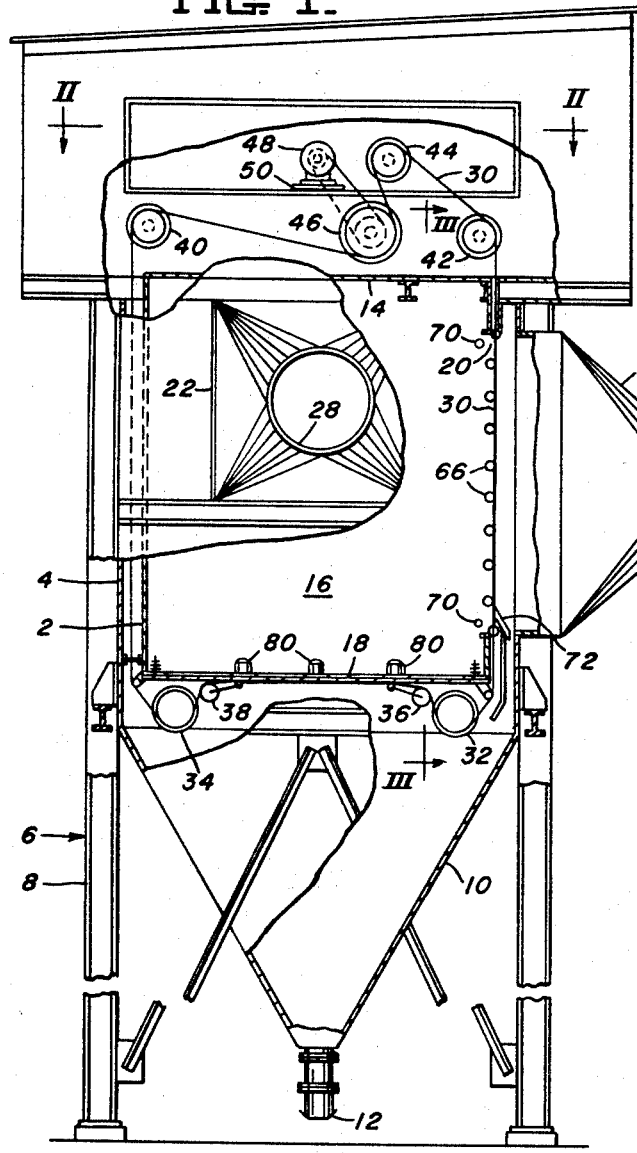
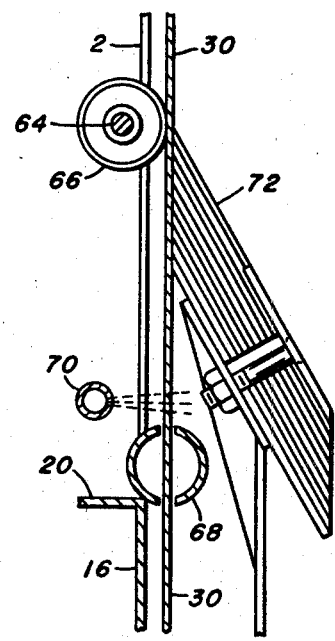
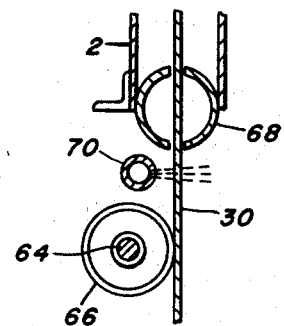
INVENTOR.
BRONNIE F. KRANE
By Donald G. Dalton
Attorney

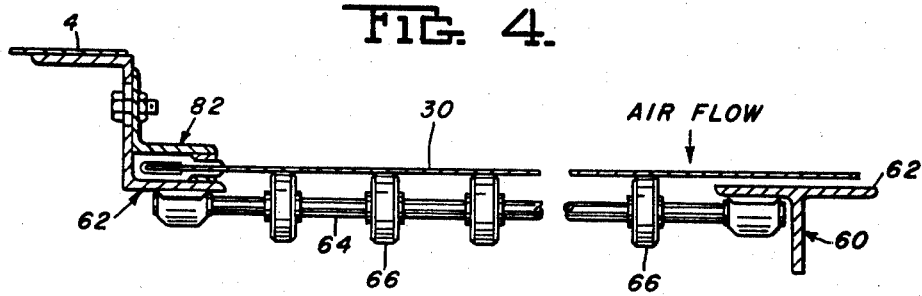
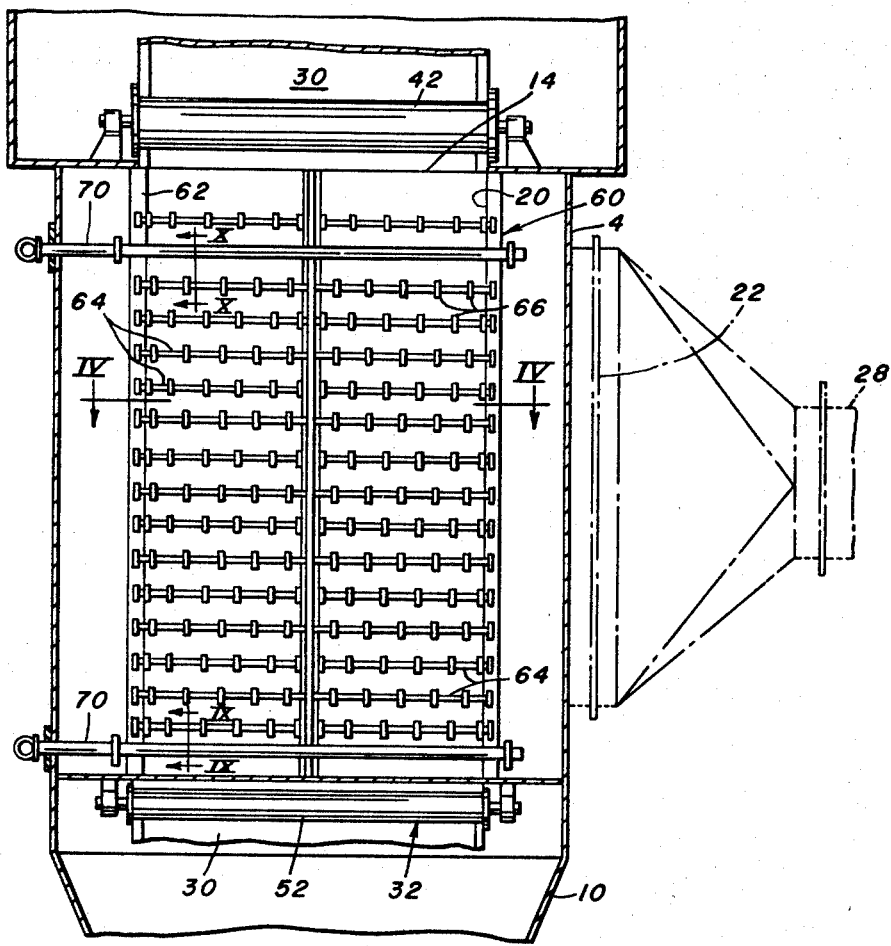

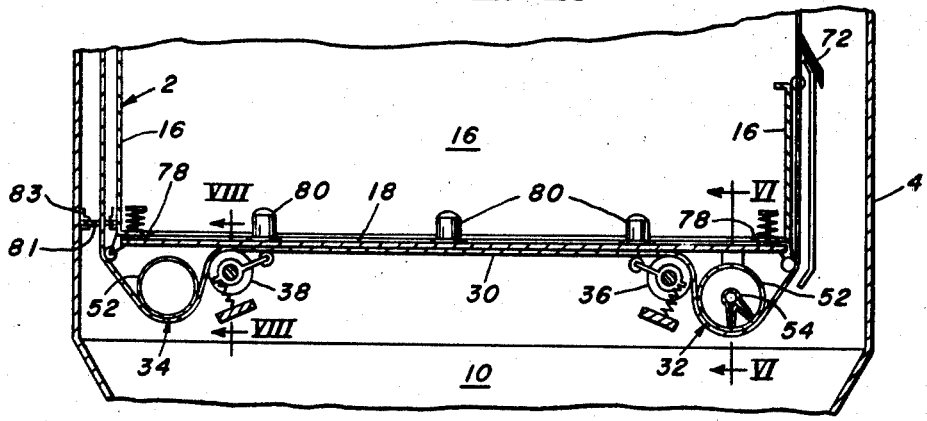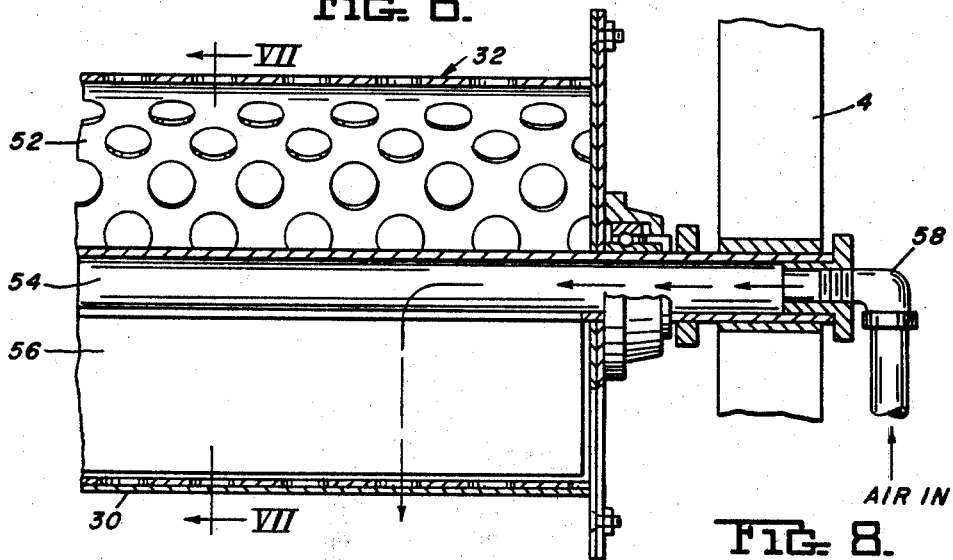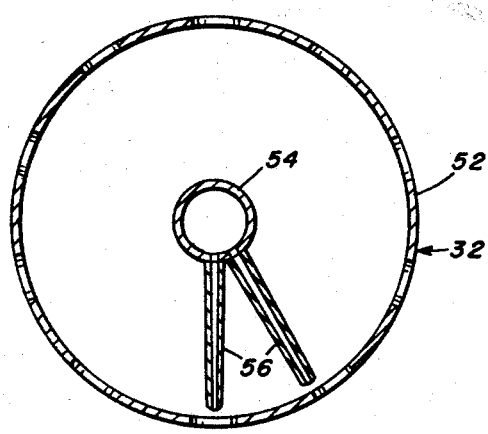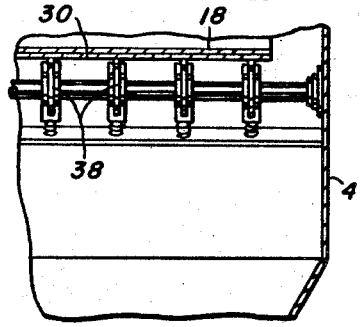
INVENTOR.
BRONNIE F. KRANE
Attorney

United States Patent Office 3,395,518
Patented Aug. 6, 1968

3,395,518
AIR FILTER WITH TRAVELING
FILTER-MEDIUM SCREEN
Bronnie F. Krane, Hammond, Ind., assignor to
United States Steel Corporation, a corporation
of Delaware
Filed Dec. 28, 1966, Ser. No. 605,275
4 Claims. (Cl. 55—290)

ABSTRACT OF THE DISCLOSURE

An air filter apparatus having a continuously traveling endless filter-medium belt entrained on pulleys around a chamber provided with an air inlet for the admission of dust-ladened air and an outlet for the passage of cleaned air. A housing having a hopper bottom and air inlet and outlet communicating with those of the chamber encloses the chamber in spaced relation thereto. One of the pulleys is driven to drive the belt downwardly across the chamber inlet and around the chamber. Means are provided in the housing below the inlets for removing dust from the belt into the hopper. These include a scraper blade disposed transversely of the belt; perforated pressure-air drums engaging the belt to blow air therethrough in the direction of the hopper; and a spring-mounted plate which forms the bottom of the chamber and has vibrators connected therewith for vibrating the plate against the belt as it passes above the hopper.

---

The present invention relates generally to dust collectors and more particularly to an improved apparatus for filtering dust-ladened air which is provided with a continuously traveling filter-medium screen or belt and means for continuously cleaning the belt.

It is well known that inhalation of excessive quantities of industrial dust over a period of time is harmful to the respiratory system. The environmental conditions encountered in sintering plants, cement mills, flour mills and the like, are particularly dangerous to workmen in such plants or mills since extremely fine particles of dust are given off by the various processes being carried out. Another factor which poses a serious problem is the emission of dust-ladened air from the stacks of such plants which, if allowed to go unabated, would cause pollution of the atmosphere in the vicinity. This, of course, creates a community health problem and is objectionable. In order to solve both problems, the dust-ladened air must be cleaned and the dust collected so as not to create an environmental health hazard either inside or outside the plant.

Many of the types of air filters or dust collectors in use prior to my invention were unsatisfactory in that they were able to remove only a small portion of the dust carried by the air so that it was necessary in many cases to utilize banks of collectors in an attempt to more thoroughly clean the air. This, of course, resulted in excessive costs and abnormal space requirements.

Another disadvantage inherent in most types of dust collectors heretofore known and used was the necessity of interrupting the operation of the device before removal of dust collected by the filter-medium could be effected.

It is, accordingly, an object of my invention to provide an improved air filter apparatus having a continuously traveling filter-medium screen and elements for continuously cleaning the filter-medium screen after it has passed through the air being filtered.

As a corollary to the above, it is another object of my invention to provide an air filter apparatus as set forth which includes an integral hopper below the traveling filter-medium screen for collecting the dust removed from the screen and from which the collected dust can be removed without the necessity of interrupting operation of the filter.

These and other objects will become more apparent after referring to the following description of my invention and attached drawings, in which:

FIGURE 1 is an elevational view of the apparatus of the invention with parts broken away for clarity;
FIGURE 2 is a plan view taken substantially along the line II—II of FIGURE 1;
FIGURE 3 is an enlarged partial elevational view taken substantially along the line III—III of FIGURE 1;
FIGURE 4 is a cross-sectional view taken along the line IV—IV of FIGURE 3;
FIGURE 5 is an enlarged partial vertical sectional view showing the bottom of the chamber of the invention;
FIGURE 6 is an enlarged cross-sectional view taken substantially along the line VI—VI of FIGURE 5;
FIGURE 7 is a cross-sectional view taken substantially along the line VII—VII of FIGURE 6;
FIGURE 8 is a cross-sectional view taken substantially along the line VIII—VIII of FIGURE 5;
FIGURE 9 is an enlarged cross-sectional view taken substantially along the line IX—IX of FIGURE 3; and
FIGURE 10 is an enlarged cross-sectional view taken substantially along the line X—X of FIGURE 3.

Referring more particularly to the drawings, reference numeral 2 designates a substantially air-tight chamber which is spatially enclosed by housing 4 supported by a frame 6 made up of structural beams 8. The bottom of the housing 4 below the chamber 2 is shaped to form an integral hopper 10 having a cleanout opening 12 at the bottom thereof.

The chamber 2 is formed with a top wall 14, side walls 16, and a bottom wall 18. An air inlet opening 20 is provided in one of the side walls 16 and an air outlet opening 22 is formed in another side wall normal to the air inlet opening. A suction fan (not shown) is provided in a duct 28 leading from the air outlet opening which functions to draw air into the chamber through the air inlet opening from the flared terminal portion 26 of a duct 24.

The duct 24 is connected with the housing 4 with the flared terminal portion 26 communicating with the interior of the housing aligned with the air inlet opening 20 of the chamber 2. The duct 24 functions to conduct a flow of dust-ladened air into the chamber by means of the negative pressure created in the chamber by the suction fan in the air outlet duct 28.

An endless belt 30, made of Dacron, Orlon, cotton, fiber glass or other suitable material, comprises the filtering medium of the invention, and, as best shown in FIGURES 1, 2, and 3, is entrained over drum-type pulleys 32 and 34; idler pulleys 36, 38, 42, and 44; a take-up pulley 40; and around a rubber lagged drive pulley 46 which is connected with and driven by a variable speed motor-reducer drive unit 48 mounted on a platform 50 in the housing 4 above the drive pulley. Idler pulleys 36 and 38 each preferably consist of a shaft having discs of rubber or similar material spaced therealong, as best shown in FIGURE 8.

Each of the pulleys 32 and 34 includes a perforated cylindrical shell 52 mounted for rotation about a fixed hollow shaft 54 having radially extending longitudinal nozzles 56 for conducting pressure-air from the shaft to the perforated circumferential surface of the shell 52. As best shown in FIGURES 1 and 5, the belt 30 engages the bottom portion of each of the pulleys 32 and 34 so that air issuing from the perforations in the cylindrical shells 52 passes through the belt to dislodge dirt therefrom and blow it down into the hopper 10. One end of the shaft 54 (not shown) is closed and a pressure-air supply pipe 58 is connected with its other end for conducting pressure-air thereto from a supply source (not shown).

A support-rack 60 which comprises a frame 62 having shafts 64 journaled for free rotation thereon, and a plurality of rollers 66 spaced along each of the shafts for rotation therewith, is mounted in the air inlet opening 20 of the chamber 2. The support-rack 60 provides a rigid backing for the belt 30 as it travels downwardly across the air inlet 20 in front of the flared terminal end 26 of the duct 24. The rack prevents the belt 30 from billowing inwardly of the chamber.

The upper and lower edges of the air inlet opening 20 are provided with sealing means each made up of a horizontally disposed split rubber coated pipe 68 and pressure-air pipe 70 spaced inwardly of the inlet opening from each of the split pipes 68. The belt 30 passes through the upper split pipe 68 as it approaches the air inlet 20 and then through the lower split pipe 68 as it passes beyond the air inlet. Each of the air pipes 70 is formed with a plurality of uniformly spaced air holes along one side of its length directed normal to and toward the inner surface of the belt 30 adjacent the chamber 2. The air sprays from the air pipes 70 act as air curtains and prevent dust-ladened air from entering the interior areas of the housing where the pulleys and the drive mechanism for the belt 30 are located.

A knife-edge rubber scraper 72 is mounted in the housing 4 extending transversely of the path of the belt just above the lower edge of the air inlet 20 for the purpose of scraping the surface of the belt as it travels downwardly away from the air inlet and removing the top layer of dust particles from the belt to cause it to fall into the hopper 10.

The steel plate 18 which forms the bottom of the chamber 2 is spring-mounted at the four lower corners of the chamber sealed against the bottom edges of the side walls 16 by means of rubber gaskets 78. Electric or air-operated vibrators 80 are mounted on the upper side of the plate 18 for vibrating the plate against the belt 30 to effect removal of more dust from the belt into the hopper 10.

In operation, dust-ladened air is drawn into the chamber 2 by the negative pressure created therein by the suction fan in the air outlet duct 28. As the air enters the housing 4 from the flared terminal 26, the heavier particles of dust contained therein drop directly down into the hopper 10 before the air is drawn into the chamber. The smaller size suspended particles of dust in the air flowing into the chamber are trapped against the filter-medium belt 30 which is continuously traveling downward across the air inlet opening 20 in front of the flared terminal portion 26 of the air duct 24. The belt 30 travels at a fixed rate of speed based on the amount of dust in the air to be cleaned. If the air is relatively heavily ladened with dust, the belt 30 is made to travel at a higher rate of speed than when a lesser amount of dust is contained in the air to be cleaned.

As the dust particles are collected on the belt 30, they are carried downwardly past the scraper 72 which removes the top crust or layer of dust from the belt surface and causes it to drop into the hopper 10 therebelow. As the belt 30 continues to travel downwardly away from the air inlet 20, it engages the lower perimeter of the perforated cylinder 52 of the pulley 32 where it is acted on by streams of air under pressure emitted from the periphery of the surface of the cylinder 52. The air thus caused to flow through the belt forces more dust particles to drop off of the belt into the hopper 10 therebelow. The belt 30 continues over idler pulley 36, which brings the belt up snug against the bottom smooth surface of the plate 18. The vibrators 80 operate continuously to provide a mild rapping effect on the belt 30 thereby causing more dust particles to drop off of the belt into the hopper 10. Immediately following the vibration step, the belt passes in engagement with the lower perimeter of the perforated cylindrical shell 52 of pulley 34 and is subjected to the pressure-air being emitted from the shell which causes any remaining dust particles to drop off the belt into the hopper 10 therebelow.

After the belt 30 leaves the pulley 34, it passes between a pair of rubber sealing strips 81 supported in the housing 4 by angle sections 83. The sealing strips 81 prevent any dust from arising from the bottom of the housing 4 and flowing into the upper portion of the housing where the belt drive mechanism is located.

Belt 30 continues on its path after leaving the pulley 34 to travel over the take-up pulley 40, the rubber lagged drive pulley 46, and idler pulleys 42 and 44.

As the belt 30 travels downwardly across the air inlet opening 20, the two edges of the belt each pass through a seal formed by the vertical peripheral portions of frame 62 and angle sections 82 attached to the peripheral portions in spaced relation thereto. This seal functions to prevent dust-ladened air from entering the chamber 2 around the side edges of the belt.

Although I have shown but one embodiment of my invention, it will be apparent that other adaptations and modifications may be made without departing from the scope of the following claims.

I claim:
1. An air filter comprising a chamber defined by sidewalls, a top wall and a bottom wall, one of said sidewalls having an air inlet opening therethrough, another of said sidewalls having an air outlet opening therethrough, a housing substantially surrounding said chamber in spaced relation thereto, said housing including sidewalls parallel with and spaced from the sidewalls of said chamber, one of the housing sidewalls having an air inlet opening therethrough in registry with said air inlet opening in said one of said sidewalls of said chamber, another of said housing sidewalls having an air outlet opening therethrough in registry with said air outlet opening in said another of said sidewalls of said chamber, a hopper having a downwardly, inwardly tapering wall with an outlet in said housing spaced below said chamber, the top of said hopper being defined by the bottom portions of the sidewalls of said housing, an endless filter-medium belt in said housing trained and mounted for movement around said chamber, means mounted in said housing guiding movement of said belt in a downward path extending across the air inlet opening in said one of said sidewalls of said chamber and continuously around said chamber, fluid sealing means in said chamber surrounding the path of said belt across the air inlet opening in said one of said sidewalls of said chamber, means for driving said belt around said chamber, and scraper means disposed in said housing extending transversely across the path of said filter medium belt between said air inlet opening in one of said chamber sidewalls and said hopper in said housing adapted to scrape particles into the hopper from the surface of said belt remote from said chamber.

2. Apparatus as defined by claim 1 in which a rigid perforated support-rack is mounted in said air inlet opening of said chamber parallel with the path of said belt across said last-mentioned air inlet opening, said support-rack including a frame, a plurality of spaced shafts journaled for free rotation on said frame and extending transversely of the path of said belt across the chamber air inlet opening, and a plurality of rollers spaced along each of said shafts for rotation therewith.

3. Apparatus as defined by claim 1 in which said guiding means includes a plurality of spaced rotatable pulleys journaled in said housing, at least one of said pulleys engaging the surface of said belt facing said chamber at a point above said hopper and below said chamber, said at least one of said pulleys being in the form of a perforated cylinder, and pressure-air supply means connected with said last-mentioned pulley whereby pressure-air is blown through said belt to remove dust therefrom and impel said dust into said hopper.

4. Apparatus as defined by claim 1 in which the bottom of said chamber is in the form of a spring mounted plate disposed adjacent to and parallel with the path of said belt below said chamber and above said hopper, and vibrating means connected with said plate effective to vibrate the same against said belt to effect removal of dust from said belt into said hopper.

References Cited
UNITED STATES PATENTS

| | | | |
|---|---|---|---|
| 935,359 | 9/1909 | Diver | 210—384 |
| 1,783,181 | 12/1930 | Birkholz | 55—354 |
| 2,596,518 | 5/1952 | Bahnson | 55—291 |
| 2,963,158 | 12/1960 | Jung | 210—384 |
| 3,075,333 | 1/1963 | Revell | 55—351 |
| 3,127,256 | 3/1964 | Boylan | 55—351 |
| 3,138,088 | 6/1964 | Foth | 210—386 |
| 3,158,455 | 11/1964 | Lincoln | 55—292 |
| 3,309,847 | 3/1967 | Donaldson | 55—290 |

HARRY B. THORNTON, *Primary Examiner.*

B. NOZICK, *Assistant Examiner.*